No. 709,679. Patented Sept. 23, 1902.
C. H. OCUMPAUGH.
BICYCLE.
(Application filed Apr. 29, 1898.)
(No Model.)
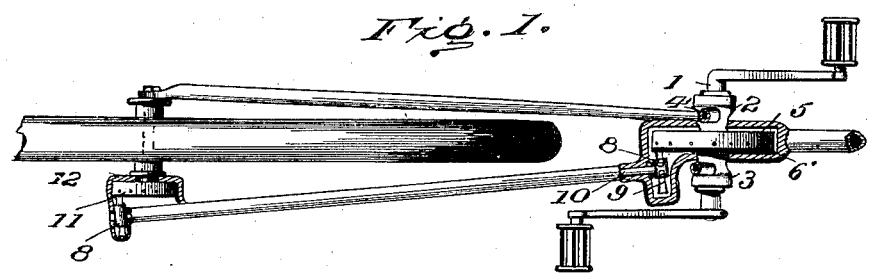
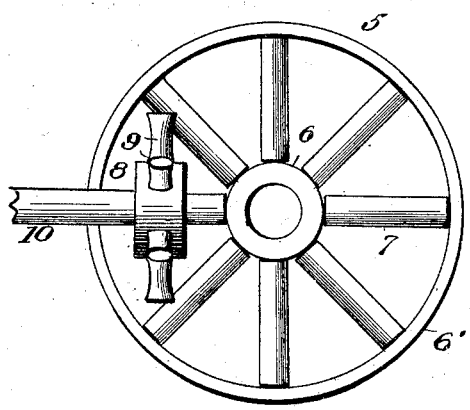 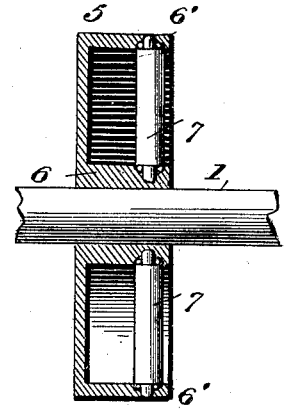
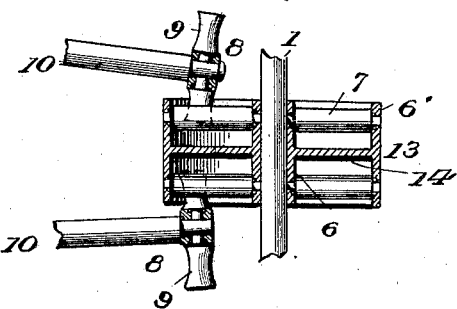
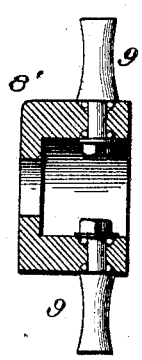
Witnesses
Inventor
Charles H. Ocumpaugh
by Benj' R. Catlin
Attorney
THE NORRIS PETERS CO., PHOTO-LITHO., WASHINGTON, D. C.

UNITED STATES PATENT OFFICE.

CHARLES HERBERT OCUMPAUGH, OF ROCHESTER, NEW YORK.

BICYCLE.

SPECIFICATION forming part of Letters Patent No. 709,679, dated September 23, 1902.

Application filed April 29, 1898. Serial No. 679,184. (No model.)

*To all whom it may concern:*

Be it known that I, CHARLES HERBERT OCUMPAUGH, a resident of Rochester, in the county of Monroe and State of New York, have invented certain new and useful Improvements in Bicycles; and I do hereby declare the following to be a full, clear, and exact description of the invention, such as will enable others skilled in the art to which it pertains to make and use the same.

The invention relates to chainless side-shaft bicycles, and has for its object to provide simple, durable, and certainly-operating means for transmission of power from the crank-shaft to the wheel-hub.

The invention consists in the construction hereinafter described and pointed out.

In the accompanying drawings, Figure 1 is a partial plan of a bicycle with the improvement. Fig. 2 is a plan of a gear. Fig. 3 is a section of the same. Fig. 4 is a broken plan of a modification. Fig. 5 is a section of a modified detail.

Numeral 1 denotes the crank-shaft of a bicycle supported in bearings or hangers 2 and 3 at the foot of the frame fork members 4, the latter being represented in the drawings as broken away. To the crank-shaft, between the bearings 2 and 3, is fixed a gear-wheel, which comprises a cup-like case 5, consisting of a flanged disk. To this is fixed a central sleeve 6, which is also fixed on the shaft.

7 denotes rollers, having their ends journaled, respectively, in the sleeve 6 and in the rim or outer flange 6' of the case 5. These preferably run upon antifriction-balls, as indicated.

8 denotes a wheel provided with pin-rollers 9, extending radially from its periphery and fixed upon a shaft 10. The pins 9 have ball-bearings and mesh with the rollers 7 within the cup or wheel 5. In some cases the pins may be fixed in their wheel, or in another case a spur-gear or other form of gear may be substituted for wheel 8 and its pin-rollers.

In Fig. 5 is indicated a cup-formed wheel 8', provided with peripheral pins or gear-teeth having ball-bearings and of a character suitable to mesh with the rollers of a cup-shaped wheel 5.

The opposite end of shaft 10 is provided with a similar wheel 8, with radially-disposed peripheral pin-rollers arranged to mesh with the rollers of a cup or wheel 11, which is similar to wheel 5. This wheel 11 is fixed to the main-wheel hub 12.

The shaft 10 may be inclosed in a frame-tube and the wheels cased, as represented; but this is not essential.

A modified form of the cup-shaped wheel is indicated in Figs. 4 and 5, in which 13 denotes a wheel having a web or diaphragm 14 and exterior flanges 6' and interior sleeves 6 fixed on the shaft and combined with two pin-roller wheels and with suitable shafts. The said pin-rollers mesh with roller 7 of the wheel 13, having their opposite ends journaled in the sleeves and flanges, respectively.

The main or body parts of the wheels 8 are made sufficiently thick to permit the provision of ball-bearings and to possess sufficient strength. The cup-shaped wheels are rendered strong by their disk-like form provided with an outer flange, and particularly in the case of a cup-shaped wheel having an inner sleeve, these parts providing strong and convenient support for the rollers without great thickness of metal.

It is not essential that wheel 5 and wheel 8 be used precisely as shown, and it is obvious that their relative situations, one on a side shaft and the other on a wheel-hub or pedal-shaft, may be reversed.

The combination of the specified forms of wheel and rollers renders it easy to insure a secure and certainly-operating mesh not liable to be seriously affected by wear or by slight distortion of the frame or of the gear connections, and the construction provides for a wide variation of the angle of the side shaft to the crank-shaft and to the hub-axis or a like variation of the angle of analogous parts when the gears are employed in other machines.

Having described my invention, I claim—

In a bicycle, the combination of a pedal-shaft, the cup-shaped wheel having an interior sleeve fixed to the shaft and a concentric rim, rollers journaled to revolve wholly within the cup-shaped depression of the wheel near its mouth, the ends of the rollers being mounted in the sleeve and rim, and a disk-shaped wheel having radially-arranged pin-rollers to mesh with the rollers of the cup-wheel, substantially as described.

In testimony whereof I have signed this specification in the presence of two subscribing witnesses.

CHARLES HERBERT OCUMPAUGH.

Witnesses:
J. P. OCUMPAUGH,
KATHERINE THORNTON.